(12) United States Patent
Singh

(10) Patent No.: US 9,342,834 B2
(45) Date of Patent: May 17, 2016

(54) SYSTEM AND METHOD FOR SETTING GOALS AND MODIFYING SEGMENT CRITERIA COUNTS

(75) Inventor: Mona Singh, Cary, NC (US)

(73) Assignee: Teradata US, Inc., Dayton, OH (US)

( * ) Notice: Subject to any disclaimer, the term of this patent is extended or adjusted under 35 U.S.C. 154(b) by 497 days.

(21) Appl. No.: 12/643,444

(22) Filed: Dec. 21, 2009

(65) Prior Publication Data

US 2011/0154254 A1    Jun. 23, 2011

(51) Int. Cl.
*G06F 7/00*     (2006.01)
*G06F 17/30*    (2006.01)
*G06Q 30/02*    (2012.01)

(52) U.S. Cl.
CPC ....... *G06Q 30/02* (2013.01); *G06F 7/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 7,467,131 B1* | 12/2008 | Gharachorloo | G06F 17/30902 |
| 7,822,762 B2* | 10/2010 | Payne | G06F 17/30964 |
| | | | 707/748 |
| 7,930,681 B2* | 4/2011 | Kloeffer et al. | 717/120 |
| 2004/0138988 A1* | 7/2004 | Munro et al. | 705/37 |
| 2005/0222993 A1* | 10/2005 | Ohtomo | 707/3 |
| 2007/0073667 A1 | 3/2007 | Chung | |
| 2007/0168874 A1* | 7/2007 | Kloeffer et al. | 715/764 |
| 2007/0233663 A1* | 10/2007 | Ami | G06F 17/30241 |
| 2008/0133502 A1 | 6/2008 | Gurevich et al. | |
| 2008/0301093 A1 | 12/2008 | Haugen et al. | |
| 2009/0106241 A1 | 4/2009 | Blackwell | |

\* cited by examiner

*Primary Examiner* — Tuan A Pham
(74) *Attorney, Agent, or Firm* — Schwegman, Lundberg & Woessner, P.A.

(57) ABSTRACT

Methods and systems may operate to include displaying to a user a graphical user interface (GUI) to enable the user to combine multiple search criteria having variable parameters, used in searching of a database, to produce a predefined count of search results. User selections of the multiple search criteria, values for the variable parameters, and Boolean operations to combine the search criteria may be received from the user. As the received user selections change, a count of search results retrieved from the database, based on the user selections, may be dynamically displayed. Additional methods and systems are disclosed.

21 Claims, 7 Drawing Sheets

FIG. 6

SYSTEM AND METHOD FOR SETTING GOALS AND MODIFYING SEGMENT CRITERIA COUNTS

BACKGROUND

An effective Customer Relationship Management (CRM) may help enterprises to really know their customers. Having a better understanding of their customers, enterprises may quickly resolve challenges such as customer value, acquisition, growth, and retention while enhancing their return on investment (ROI). In particular, the growth of the Internet, mobile sales channels, and social networking, has made recognizing customers across multiple touch points a challenge.

Robust database engines may facilitate more efficient targeted advertising and more relevant conversations with customers, which may lead to more profitable, satisfying and longer-lasting relationships. Such databases may make harnessing of advanced analytical and marketing communications more feasible.

BRIEF DESCRIPTION OF THE DRAWINGS

Some embodiments of the disclosed technology are illustrated by way of example and not limitation in the figures of the accompanying drawings in which:

FIG. 6 is a screen shot of a GUI for modifying search criteria, according to various embodiments

DETAILED DESCRIPTION

Figure 1:
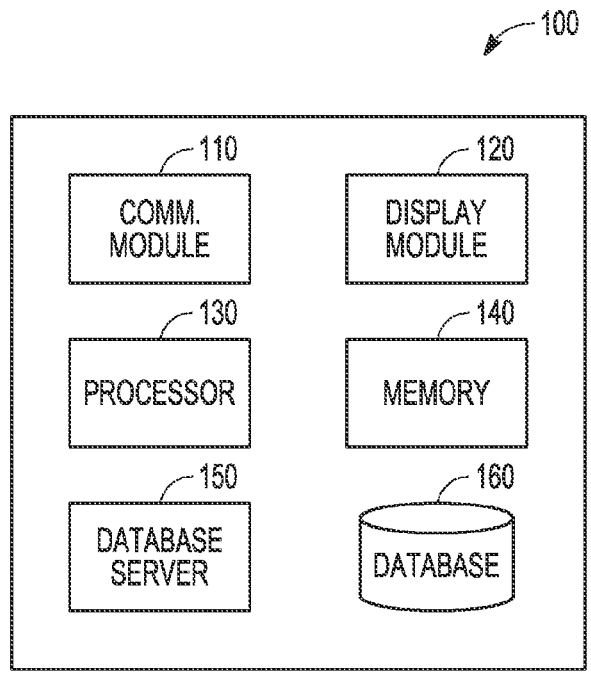
FIG. 1 illustrates a system for setting goals and modifying segment criteria counts, according to various embodiments.

Example methods and systems for setting goals and modifying segment criteria counts will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments of the invention are given for the purpose of simplified explanation, and not limitation.

Some embodiments described herein include displaying to a user a graphical interface (GUI) to enable the user to combine multiple search criteria having variable parameters, used in searching of a database, to produce a predefined count of search results (e.g., a preset goal). User selections of the multiple search criteria, values for the variable parameters, and Boolean operations to combine the search criteria may be received from the user. As the received user selections change, a count of search results retrieved from the database, based on the user selections, may be dynamically displayed.

The predefined count of the search results (e.g., a preset goal) may comprise a preset target value set by a user for the counts of the search results. For example, many Customer Relation Management (CRM) applications may involve a user specifying a market segment, for instance, to take certain business actions. The business actions may comprise sending communication or promotional offers to customers that may involve a significant burden in monetary or personnel costs. Typically, the user may have a goal with regard to the size of the market segment along with knowledge of the variable parameters (hereinafter, parameters), on which some desired criteria may be based.

For example, the user (e.g., a marketing manager) may have approval for offering a "10% off coupon" to up to 1,200 middle-aged, female, high-volume shoppers. That is, the user may know that gender, age, and number of purchases completed during a time period in the past (e.g., last year) are relevant parameters, but the values for the age and the number of purchases may be only approximately known at the outset.

The proposed invention may enable the user to fine-tune the market segment specification (e.g., the 1200 middle aged, female, high-volume shoppers in the above example) by adjusting and experimenting with segment search criteria (e.g., running what-if scenarios) and readily determine the criteria that would achieve the goal, as described herein in more detail. Traditionally, exploring this space of what-if scenarios can be tedious and time consuming.

Some embodiments in the present disclosure may comprise CRM scenarios including improving users' productivity, for example, in specifying a market segment, and helping users meet their business objectives in a more efficient manner. The disclosed embodiments may also help users to view an updated value of the goal (e.g., before reaching the preset goal) along with updated parameters' values and updated aggregate information corresponding to the combination of various criteria specified by a user. The user is allowed to add or remove individual criteria and/or edit individual criteria by modifying the parameters involved. The user is also enabled to apply different Boolean operators to combine the criteria. For each such tweak, the user can see how it affects a count of the search results (e.g., goal of the number of members of the desired market segment in the above example).

In another embodiment, an online business owner may want to select a group of items to be shown on an online advertisement page. The advertisement page may only have enough space to accommodate a certain number of item images (i.e., a preset goal). The user may select the item by experimenting with search criteria, as described herein, to retrieve the desired number of items from a database.

In general, the disclosed method and systems may be applied to any database search scenario, in which the user wishes to achieve a preset count of search results (i.e., a preset goal). The search scenarios may include CRM applications (e.g., market segment specification described above), inventory management (e.g. performing a database search to select a number of items from a list of items stored in a storage room for disposal to create room for a predefined number (i.e., a preset goal) of new items, event management applications (e.g., searching a database to select a predefined number of people (i.e., a preset goal) to invite for an event from a list of a large number of people stored in a database), and the like.

In an embodiment, the disclosed methods may be used in one or more Web applications provided to the user via Web interfaces. The Web applications may be supported by a system 100 shown in FIG. 1 and described below. In other embodiments, the disclosed methods may be provided as one or more client applications to be installed and executed on a client machine.

FIG. 1 illustrates the system 100 for setting goals and modifying segment criteria counts, according to various embodiments. The system 100 may comprise a communication module 110, a display module 120, a processor 130, a memory 140, a database server 150 and a database 160. For embodiments described herein, the display module 120 interacts with the display unit 810 shown in FIG. 8 to display various objects. The memory 140 may comprise or be part of a main memory 870 or a static memory 880, both shown in FIG. 8. The database 160 may be retained in disk drive unit 840 shown in FIG. 8.

Figure 7:
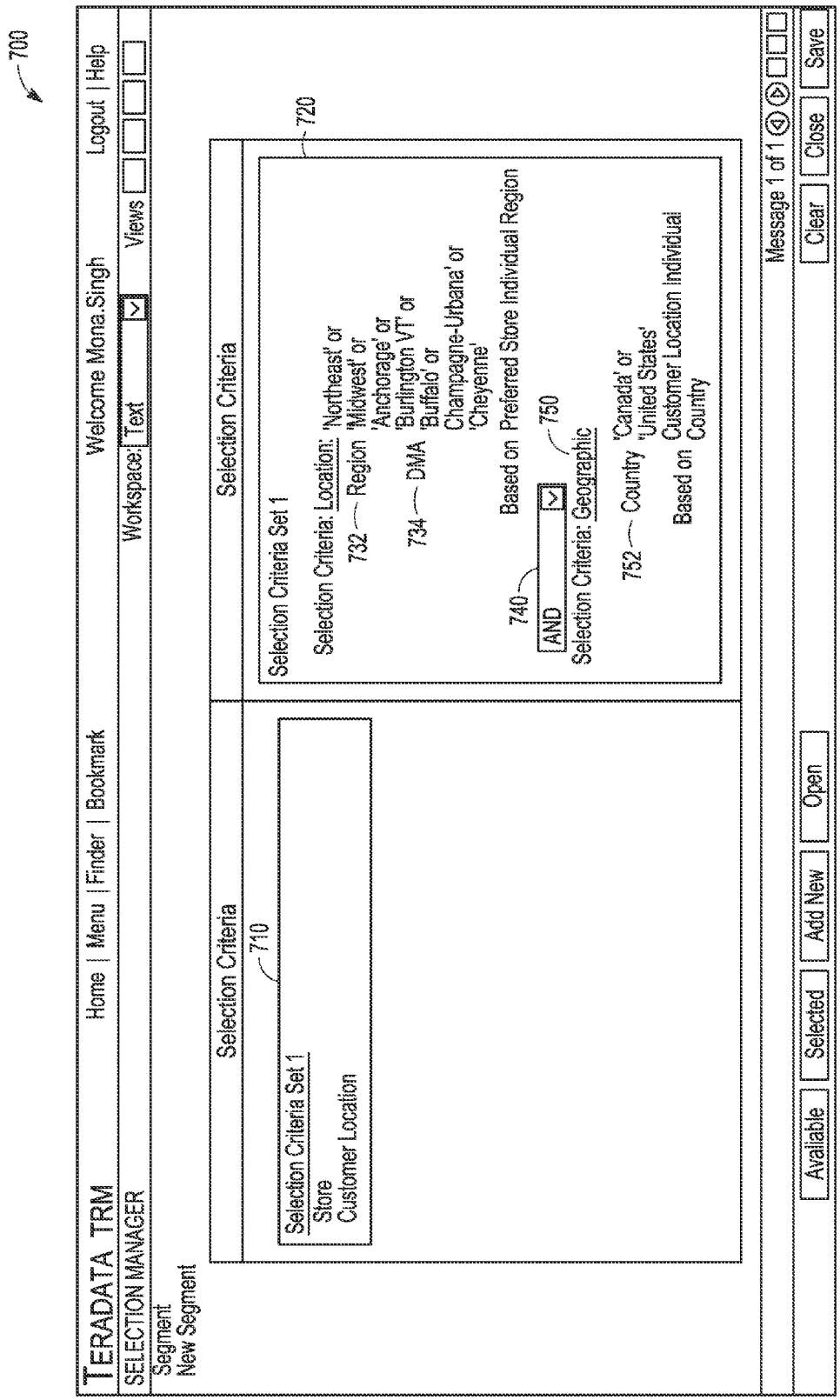
FIG. 7 is a screen shot of a GUI for further modifying search criteria, according to various embodiments.
Figure 8:
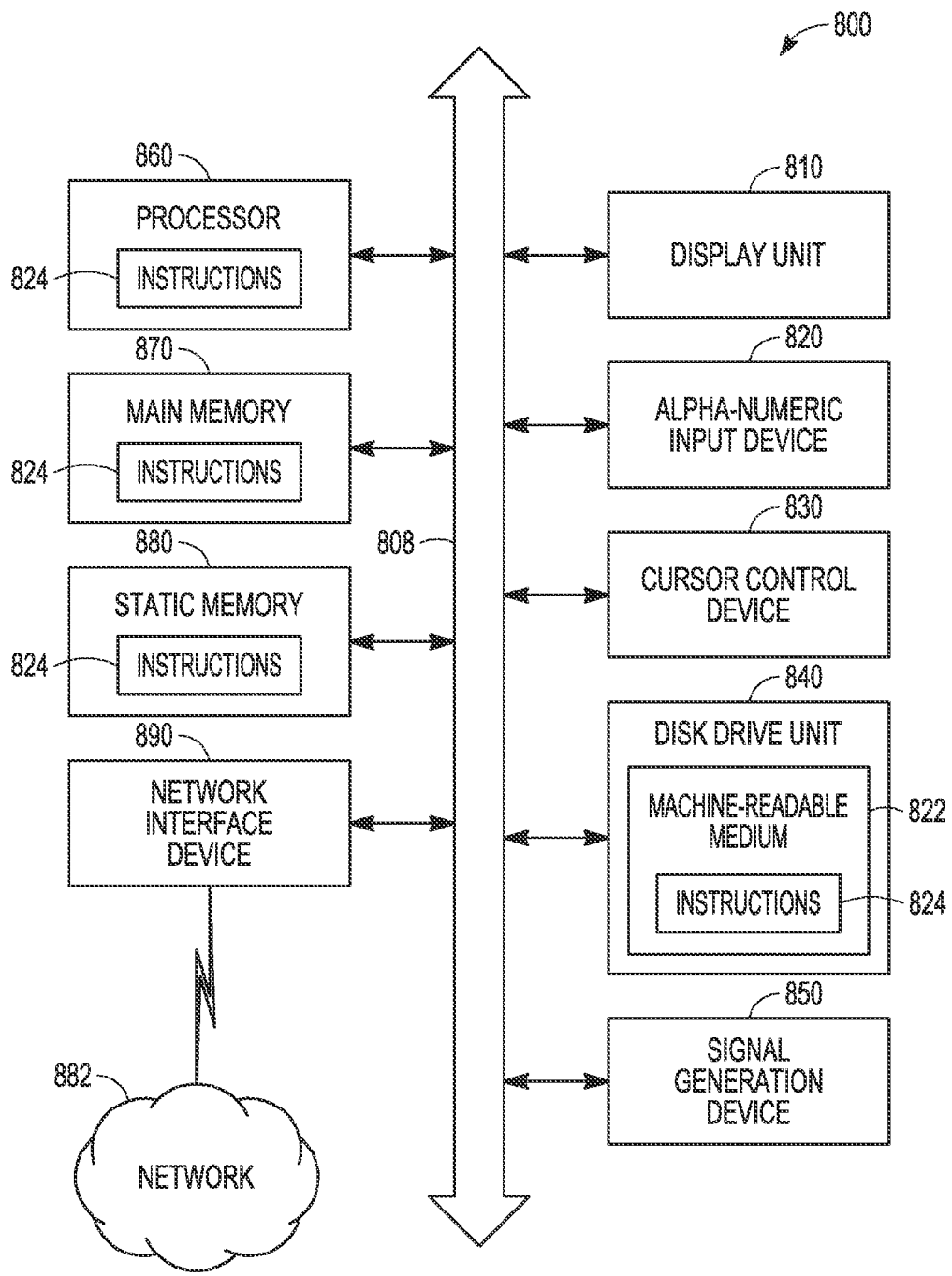
FIG. 8 is a block diagram of a machine, according to various embodiments.

The communication module 110 and the display module 120 may comprise software modules stored in memory 140, main memory 870, or the static memory 880 shown in FIG. 8 and be implemented by the processor 130 or the processor 860 shown in FIG. 8. The system 100 may support a Web application that enables a user to search one or more databases (e.g., database 160) to produce a predefined count of search results (preset goal). The display module 120 may display a graphical user interface (GUI), such as the GUIs 300, 500, 600, and 700 shown, respectively, in FIGS. 3, 5, 6, and 7. The GUIs may enable a user to combine multiple search criteria to achieve the preset goal. Each criterion may comprise one or more parameters, for which the user may select or set a value.

Figure 3:
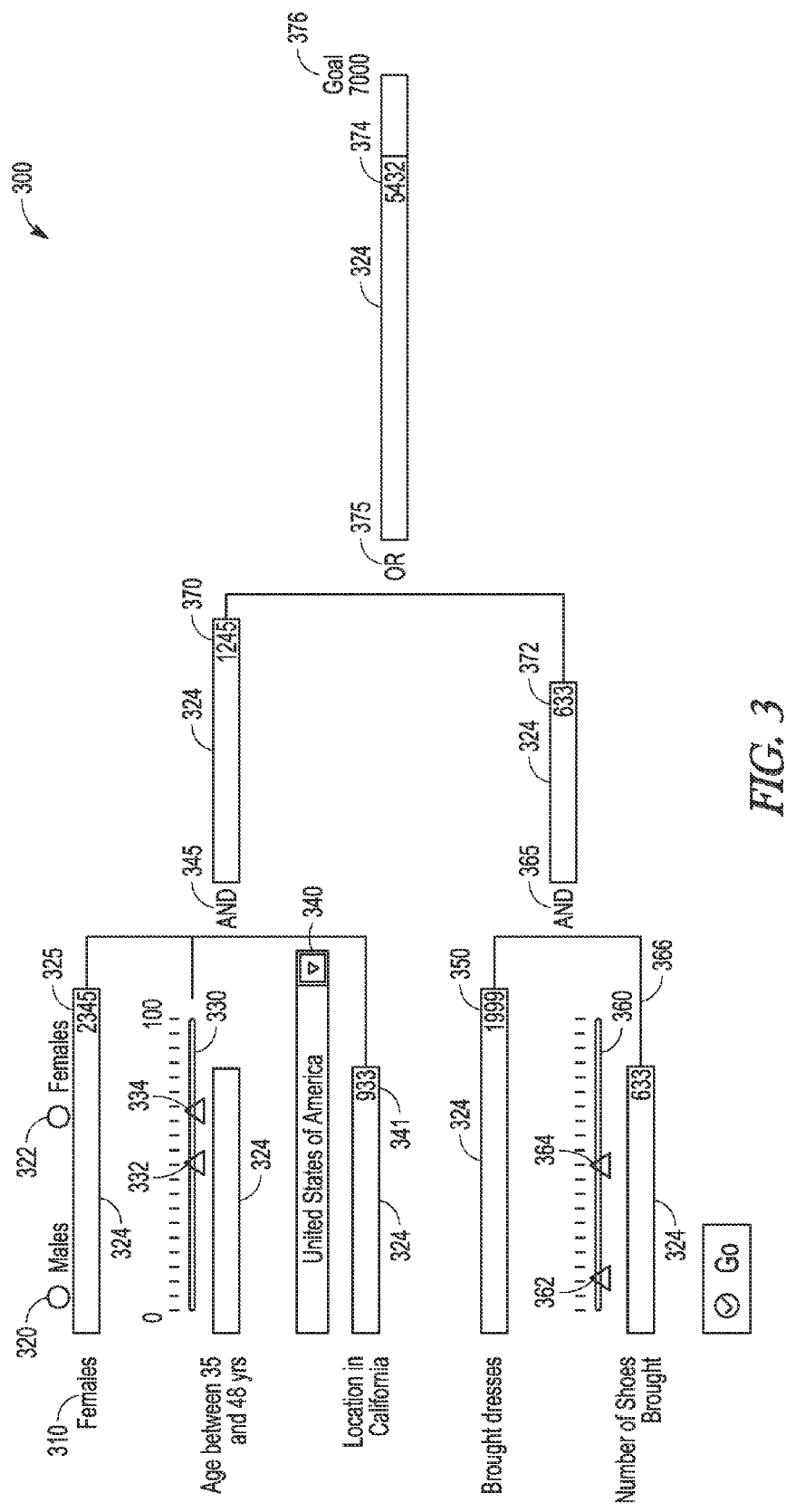
FIG. 3 is a graphical user interface (GUI) for setting goals and modifying segment criteria counts, according to various embodiments.

The communication module 110 may receive user selections of the multiple search criteria, values for the parameters (e.g., values for age selected by sliders 332 and 334 shown in FIG. 3), and Boolean operations (e.g., AND operations 345 and 365 and OR operation 375, shown in FIG. 3) to combine some of the plurality of search criteria. The display module 120 may dynamically display updated counts of the search results including intermediate search results (e.g., segment criteria counts 325, 340, 350, and 374) retrieved from the database 160 by the database server 150, based on the user selections, as the received user selections change.

The user may change the user selections and effectively modify segment criteria counts at any time and watch the updated values for the search results changing accordingly. The changes made to the user selections may be received by the communication module 110 as events detected from an input device such as the alpha numeric input device 820 (e.g., a keyboard) or the cursor control device 830 (e.g., a mouse), both shown in FIG. 8. The memory 140 may save settings of the GUI (e.g., search criteria, the way the search criteria are combined with Boolean operators, location of sliders, and the like) including updated counts of the search results (such as the segment criteria counts) corresponding to the saved settings.

Figure 2:
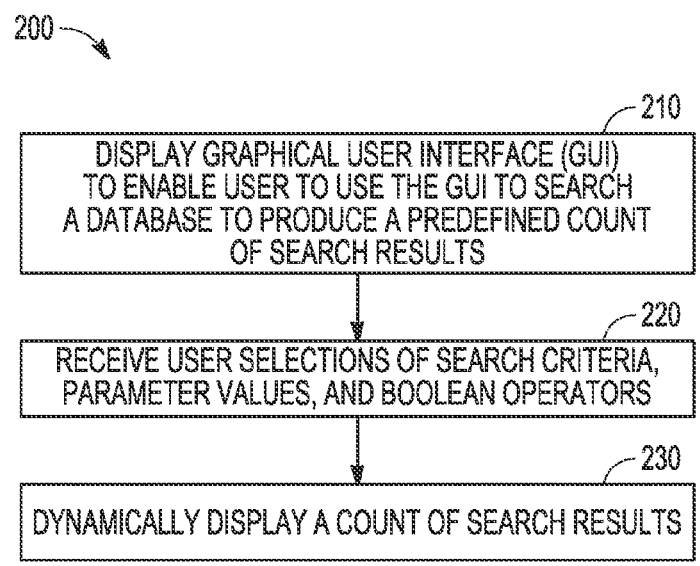
FIG. 2 is a flow diagram illustrating a method of setting goals and modifying segment criteria counts, according to various embodiments.

FIG. 2 is a flow diagram illustrating a method 200 of setting goals and modifying segment criteria counts, according to various embodiments. At operation 210, the system 100 of FIG. 1 may use the display module 120 of FIG. 1 to display a GUI, such as GUI 300 of FIG. 3 to a user. The GUI may enable the user to search a database using multiple search criteria. The search criteria may be combined via Boolean operators (such as AND and OR). The user may change the parameters associated with each criteria to modify segment criteria counts (e.g., counts 330 changed by varying the age parameter using sliders 332 and 334) and eventually achieve the preset goal (e.g., preset goal 376 of FIG. 3 set at a value of 7000).

At operation 220, the communication module 110 of FIG. 1 may receive user selections including, search criteria, set values of parameters and the selected Boolean operations that combine some of the search criteria. The user selections may be saved in memory 140 of FIG. 1.

At operation 230, the display module 120 may dynamically show updated counts for intermediate search results (e.g., segment criteria counts 325 associated with a gender segment criterion) and the final search result (e.g., an overall search result count 374, shown in FIG. 4), based on the user selections. As the user selections change by the user modifying the segment criteria, parameter values and the way the segment criteria are combined via the selected Boolean operators, the displayed counts follow the changes in real time.

FIG. 3 is a GUI 300 for setting goals and modifying segment criteria counts, according to various embodiments. The GUI 300 represents an example CRM scenario where a user (e.g., a marketing manager) may have approval for offering a "15% off coupon" to up to 7000 middle-aged, female, high-volume shoppers. The user is tasked with searching a CRM database (such as the database 160 of FIG. 1) to find 7000 women who are middle aged and high-volume shoppers. The GUI 300 is designed for the user to perform the search and conveniently change search criteria parameters to achieve the preset goal 376 as set to a target value of 7000. The GUI 300 allows the user to select parameter values for the segment search criteria specified under reference number 310 (e.g., gender, age, location, number of dresses bought, and number of shoes bought).

The gender criterion may be selected by the selection buttons 320 and 322. A segment criterion count 325 indicates that 2345 of the customers in the database 160 are female. The user may vary a range for the age criterion by moving the sliders 332 and 334 in a slot 330 to set the lower and the higher limit of the age criterion. The location drop-down box 340 allows the user to select a location in the United States. In some embodiments, the location selection drop-down box may not be limited to the United States and provide selections for other countries as well. The segment criterion count 341 shows a value 933 for the number of customers in the database 160 that are associated with a location in California.

The gender, age, and location criteria are combined via the AND operation 345. The segment criterion count 370 indicates that 1245 of the 2345 women in the database 160 are within the set age range of 35-48 years and are associated with a location in California. For the number of customers who bought dresses, there is no parameter to change and the total number in the database 160 is shown by the segment criterion count 350 to be 1999. A range for the number of shoes bought by each customer (e.g., between 2 and 10) may be varied by moving the sliders 362 and 364 in a slot 360. The total number of customers in the database 160 that bought 2-20 shoes is indicated by the segment criterion count 366 as 633 customers.

The bought dresses and the number of shoes bought criteria are combined via the AND operation 365 to show the combined segment criterion count 372 of 633 customers. The overall criteria is formed by combining the criteria previously formed by the AND operations 345 and 365 using an OR operation 375. The overall search result count 374 shows a count of 5432 which is lower than a target value of 7000 shown by the preset goal 376.

In embodiments, the GUI 300 may include other graphical elements such as radio buttons and command buttons. The radio buttons may be used to change parameter values. The command buttons may, for example, allow the user to save or cancel changes in the GUI 300. An initial combination and settings of the graphical elements of the GUI 300 is based on a predefined scenario. However, the user may be allowed to modify the initial combination and settings of the graphical elements to achieve the preset goal. The user may be allowed to create new search criteria, delete one or more exiting search criteria, and/or change combination of at least some groups of criteria using the Boolean operators.

The segment search counts (e.g., 325 for the gender segment criterion) may also be represented graphically by the solid bars 324. The size of lengths and/or widths of the solid bars 324 may be changed according to the value they represent (e.g. segment search counts) to give a visual estimation of the updated counts. The visual representation of updated segment criteria counts may make experimenting with the GUI 300 more convenient. As the user changes the parameters and/or makes other modifications to the GUI 300, the user may save new configurations with the associated intermediate search results.

Figure 4:
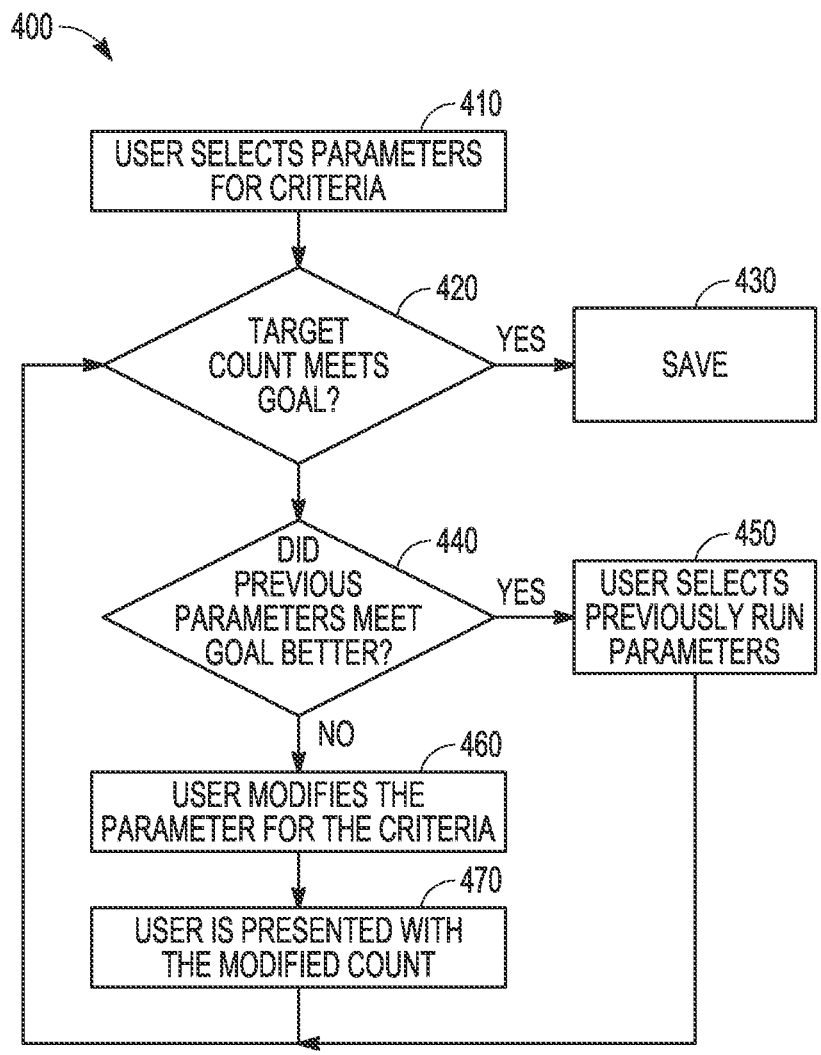
FIG. 4 a flow diagram illustrating a method of setting goals and modifying segment criteria counts, according to various embodiments.

FIG. 4 is a flow diagram illustrating a method 400 of setting goals and modifying segment criteria counts, according to various embodiments. At operation 410, a user may select parameters of the search criteria as described above with respect to GUI 300 to reach the preset goal 376 of FIG. 3. At control block 420, if the present goal 376 is met, the control is passed to operation 430, where the result is saved. Otherwise, at control block 440 it is determined whether a result produced from saved previous settings (see, for example, previous counts 510 and 520 shown in FIG. 5) was closer to meeting the preset goal.

If any of the saved previous results is closer to the preset goal, the user may, at operation 450, run the GUI with the parameters associated with that result and save. In case none of the saved previous results was satisfactory, the user may, at operation 460, modify one or more parameters of the multiple search criteria provided in the GUI 300 with respect to the previous settings to reach the preset goal. At operation 470, the search result based on the modified criteria is presented to the user and control is passed to control block 420.

Figure 5:
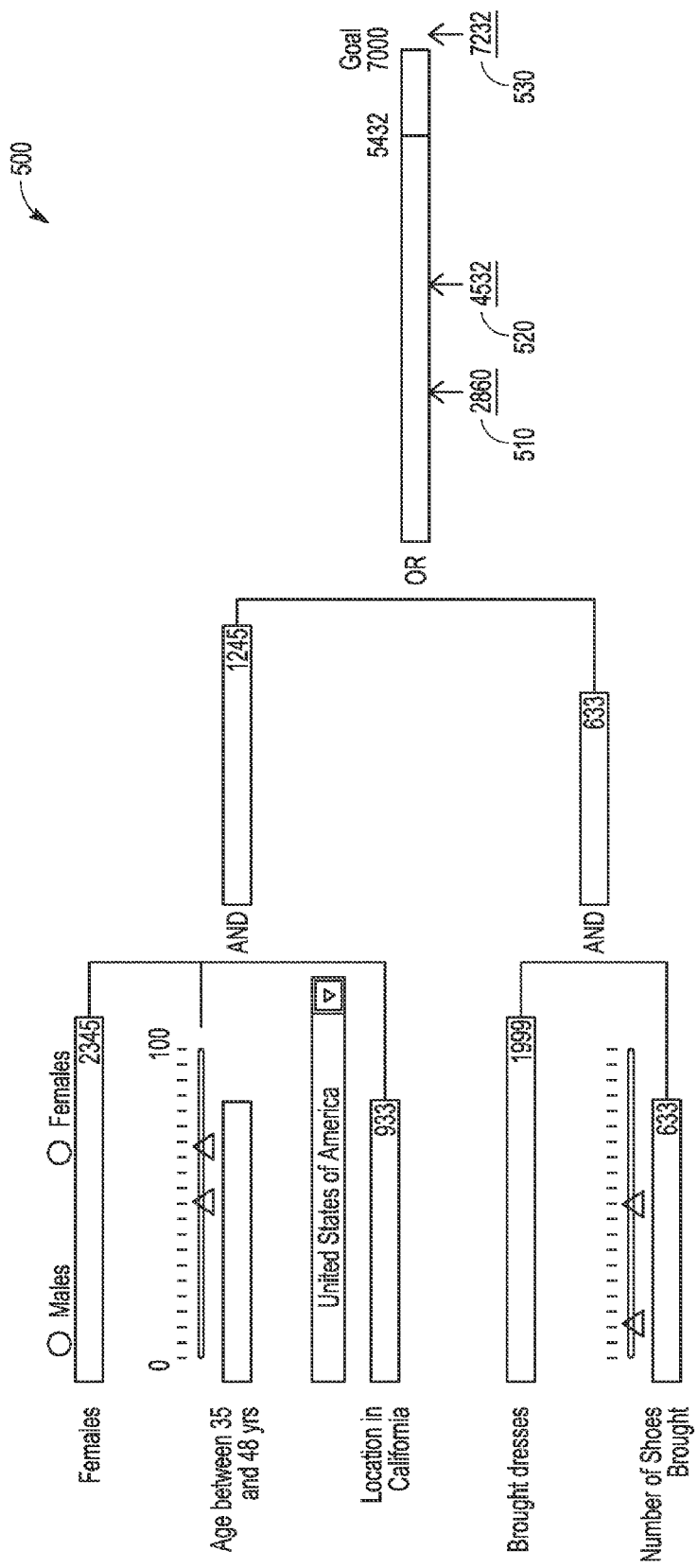
FIG. 5 is a GUI for setting goals and modifying segment criteria counts, according to various embodiments.

FIG. 5 is a GUI 500 for setting goals and modifying segment criteria counts, according to various embodiments. The GUI 500 has analogous search criteria and parameter settings as the GUI 300 of FIG. 3. The GUI 500 shows one or more previous counts 510 and 520 resulting from previous search runs. The present count 530 of 7232 is higher than the preset goal of 7000, whereas the previous count 520 is 5432 which is substantially lower than the preset goal of 7000. By comparing these two counts, the user may be lead to slightly reverse some of the changes made with respect to the previous settings associated with the previous count 520 to achieve the preset goal of 7000. In case the user needs to run a new search with modified search criteria or a different scenario the user may use GUIs 600 and 700 shown in FIGS. 6 and 7 and described below.

Figure 6:
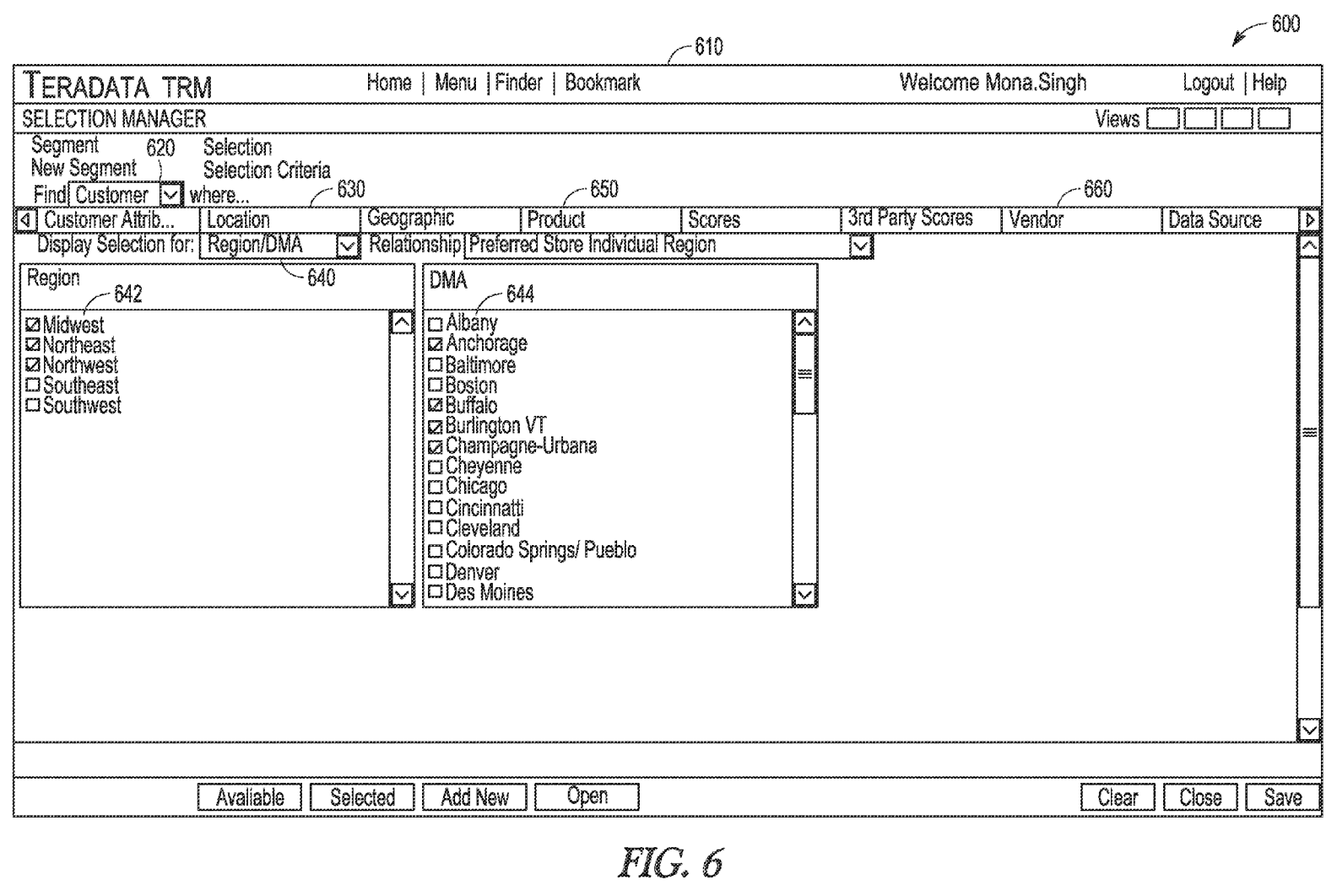

FIG. 6 is a screen shot of a GUI 600 for modifying search criteria, according to various embodiments. GUI 600 illustrates a selection manager window 610 where a user may select an option such as "customer" from the drop-down box 620. The user may define criteria with respect to various attributes associated with the customer shown, for example, by location tab 630, product tab 650, vendor tab 660, or the like. When the user activates, for instance, the location tab 630, the user is presented with a drop-down box 640, where the user may select an option such as region/DMA (direct market association). The choices for the region and DMA of the customer may be selected via the selection boxes in windows 642 and 644. The selected regions and DMA for the customer are transferred to GUI 700 of FIG. 7.

FIG. 7 is a screen shot of a GUI 700 for further modifying search criteria, according to various embodiments. In window 710, the use is presented with the selection criteria set 1 which includes store and customer location. In window 720 an expanded view of the selection criteria set 1 shows region choices 732 and DMA choices 734, selected in GUI 600 of FIG. 6, for store location in individual regions.

The user has the choice of combining the selected location criteria with geographic selection criterion 750 using a Boolean Operation selected via a drop-down box 740. The geographic selection criteria may include a country selection criterion 752 which selects customer location in an individual country.

FIG. 8 is a block diagram of a machine 800, according to various embodiments. The machine 800 may comprise a set of instructions that can be executed to cause the machine 800 to perform any one or more of the methodologies discussed herein. In alternative embodiments, the machine 800 may operate as a standalone device or may be connected (e.g., networked) to other systems. In a networked deployment, the machine 800 may operate in the capacity of a server or a client system in a server-client network environment or as a peer system in a peer-to-peer (or distributed) network environment. Machine 800 may be realized as a specific machine in the form of a computer, comprising a system similar to or identical to the timing analysis system 200 of FIG. 2. Further, any of the elements of machine 800 (e.g., the processor 860 or the memory 870, among others) may include the timing analysis system 200.

The machine 800 may comprise a server computer, a client computer, a personal computer (PC), a tablet PC, an integrated circuit, an asynchronous FPGA, or any system capable of executing a set of instructions (sequential or otherwise) that specify actions to be taken by that system. Further, while only a single machine is illustrated, the term "machine" shall also be taken to include any collection of systems that individually or jointly execute a set (or multiple sets) of instructions to perform any one or more of the methodologies discussed herein. In an embodiment, the machine 800 may operate as the system 100 of FIG. 1 or as a client machine including a client developed based on the forgoing methods such as methods 200 and 400 of FIGS. 2 and 4, respectively.

The example machine 800 may include a processor 860 (e.g., a central processing unit (CPU), a graphics processing unit (GPU) or both), a main memory 870 and a static memory 880, all of which communicate with each other via a bus 808. The machine 800 may further include a display unit 810 (e.g., a liquid crystal display (LCD) or cathode ray tube (CRT)). The machine 800 also may include an alphanumeric input device 820 (e.g., a keyboard), a cursor control device 830 (e.g., a mouse), a disk drive unit 840, a signal generation device 850 (e.g., a speaker), and a network interface device 890.

The disk drive unit 840 may include a machine-readable medium 822 on which may be stored one or more sets of instructions (e.g., software) 824 embodying any one or more of the methodologies or functions described herein. The instructions 824 may also reside, completely or at least partially, within the main memory 870 and/or within the processor 860 during execution thereof by the machine 800, with the main memory 870 and the processor 860 also constituting machine-readable media. The instructions 824 may further be transmitted or received over a network 882 via the network interface device 890.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to, tangible media, including solid-state memories and optical and magnetic media.

Various embodiments related to methods and systems for setting goals and modifying segment criteria counts have been described. The embodiments may enable a user to edit one or more cells of the grid, have the edit validated, and see additional information contextual to the grid rather than in separate forms. Although example embodiments have been described, it will be evident, after reading this disclosure that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A processor-implemented method comprising:
   displaying to a user a graphical user interface (GUI) to enable the user to combine a plurality of search criteria having variable parameters, used in searching of a database, to produce a predefined count of search results, wherein the GUI includes an entry to accept a user defined value for the predefined count of search results, wherein the GUI includes at least one sliding pointer user interface element to allow the user to set a parameter within a range, wherein displaying the GUI includes displaying graphical elements including one or more bars, drop-down boxes, selection boxes, radio buttons, texts, Boolean operators, or command buttons, and wherein displaying the GUI comprises displaying an initial combination and settings of the graphical elements based on a predefined scenario;
   receiving user selections of the plurality of search criteria including the predefined count of search results, values for the variable parameters, and Boolean operations to combine at least some of the plurality of search criteria, at least one user selection via the sliding pointer on the GUI to set a parameter within a range, wherein receiving the user selections comprises receiving user modifications of the initial combination and settings of graphical elements to achieve the predefined count of search results, and wherein receiving the user modifications of the initial combination and settings of graphical elements comprises changing one or more existing criteria including adding one or more new criteria, deleting one or more existing criteria, making changes in Boolean operators, or changing values for variable parameters in response to corresponding actions by the user, and wherein changing one or more existing criteria comprises changing a combination of at least some groups of criteria using the Boolean operators in response to one or more actions by the user;
   dynamically displaying updated counts of the search results retrieved from the database, based on the user selections, as the received user selections change, the updated counts including total counts of found items as well as segment counts, the segment counts being counts of items that meet a segment criterion;
   receiving a second set of user selections of the plurality of search criteria following the dynamic displaying of the updated counts, the second set of user selections including movement of the sliding pointer; and
   dynamically display a second set of updated counts from an intermediate search performed with the movement of the sliding pointer, the second set of updated counts showing changes to the segment counts to provide what-if simulations to the user in real-time.

2. The processor-implemented method of claim 1, wherein the predefined scenario comprises Customer Relation Management (CRM) applications including market segment specification; inventory management applications; and event management applications.

3. The processor-implemented method of claim 1, further comprising changing values for variable parameters in response to receiving at least one of a low value, a high value, or a range of values for the variable parameters from the user.

4. The processor-implemented method of claim 1, wherein dynamically displaying the updated count of the search results further comprises displaying the updated count of the search results and counts of intermediate search results associated with at least some combinations of the criteria combined by the Boolean operations.

5. The processor-implemented method of claim 1, further comprising saving one or more settings of the GUI in response to an action by the user.

6. The processor-implemented method of claim 5, further comprising displaying a saved setting of the GUI, in response to an action by the user, and receiving further modifications of the saved setting.

7. The processor-implemented method of claim 1, wherein dynamically displaying the updated count of the search results further comprises displaying the updated count of the search results after a change in a setting of the GUI, as triggered by detection of an event from an input device including a mouse and a keyboard.

8. A system comprising:
   memory to retain a database and a number of modules; and
   one or more processors coupled to the memory to execute the modules including:
      a display module to display to a user a graphical user interface (GUI) to enable the user to combine a plurality of search criteria having variable parameters, used in searching of the database, to produce a predefined count of search results, wherein the GUI includes an entry to accept a user defined value for the predefined count of search results, wherein the GUI includes at least one sliding pointer user interface element to allow the user to set a parameter within a range, wherein to display the GUI includes the display module to display graphical elements including one or more bars, drop-down boxes, selection boxes, radio buttons, texts, Boolean operators, or command buttons, and wherein to display the GUI comprises the display module to display an initial combination and settings of the graphical elements based on a predefined scenario; and a communication module to receive user selections of the plurality of search criteria including the predefined count of search results, values for the variable parameters, and Boolean operations to combine at least some of the plurality of search criteria, at least one user selection via the sliding pointer on the GUI to set a parameter within a range, wherein to receive the user selections comprises the communications module to receive user modifications of the initial combination and settings of graphical elements to achieve the predefined count of search results, and wherein to receive the user modifications of the initial combination and settings of graphical elements comprises the display module to change one or more existing criteria including to add one or more new criteria, delete one or more existing criteria, make changes in Boolean operators, or change values for variable parameters in response to corresponding actions by the user, and wherein to change one or more existing criteria comprises the display module to change a combination of at least some groups of criteria using the Boolean operators in response to one or more actions by the user, the display module to dynamically display updated counts of the search results retrieved from the database, based on the user selections, as the received user selections change, the updated counts including total counts of found items as well as segment counts, the segment counts being counts of items that meet a segment criterion;

wherein the communication module is to receiving a second set of user selections of the plurality of search criteria following the dynamic displaying of the updated counts, the second set of user selections including movement of the sliding pointer; and wherein the display module is to dynamically display a second set of updated counts from an intermediate search performed with the movement of the sliding pointer, the second set of updated counts showing changes to the segment counts to provide what-if simulations to the user in real-time.

9. The system of claim 8, wherein the display module is to dynamically display the updated count of the search results after a change in a setting of the GUI in response to detection of an event from an input device including a mouse and a keyboard.

10. The system of claim 8, wherein the display module is to dynamically display the updated count of the search results, counts of intermediate search results associated with at least some of the criteria, and search results associated with at least some combination of the criteria combined by the Boolean operations.

11. The system of claim 8, wherein the memory is to save one or more settings of the GUI including the updated count of the search results corresponding to the one or more settings.

12. The system of claim 11, wherein the display module is to display a saved setting of the GUI, in response to an action by the user, and the communications module is to receive further modifications of the saved setting.

13. The system of claim 8, wherein the predefined scenario comprises Customer Relation Management applications including market segment specification; inventory management applications; or event management applications.

14. The system of claim 8, wherein the display module is to change values for variable parameters in response to receiving at least one of a low value, a high value, or a range of values for the variable parameters from the user.

15. A non-transitory machine-readable medium comprising instructions, which when executed by one or more processors, perform a method comprising:
displaying to a user a graphical user interface (GUI) to enable the user to combine a plurality of search criteria having variable parameters, used in searching of a database, to produce a predefined count of search results, wherein the GUI includes an entry to accept a user defined value for the predefined count of search results, wherein the GUI includes at least one sliding pointer user interface element to allow the user to set a parameter within a range, wherein displaying the GUI includes displaying graphical elements including one or more bars, drop-down boxes, selection boxes, radio buttons, texts, Boolean operators, or command buttons, and wherein displaying the GUI comprises displaying an initial combination and settings of the graphical elements based on a predefined scenario;

receiving user selections of the plurality of search criteria including the predefined count of search results, values for the variable parameters, and Boolean operations to combine at least some of the plurality of search criteria, at least one user selection via the sliding pointer on the GUI to set a parameter within a range, wherein receiving the user selections comprises receiving user modifications of the initial combination and settings of graphical elements to achieve the predefined count of search results, and wherein receiving the user modifications of the initial combination and settings of graphical elements comprises changing one or more existing criteria including adding one or more new criteria, deleting one or more existing criteria, making changes in Boolean operators, or changing values for variable parameters in response to corresponding actions by the user, and wherein changing one or more existing criteria comprises changing a combination of at least some groups of criteria using the Boolean operators in response to one or more actions by the user;

dynamically displaying updated counts of the search results retrieved from the database, based on the user selections, as the received user selections change, the updated counts including total counts of found items as well as segment counts, the segment counts being counts of items that meet a segment criterion;

receiving a second set of user selections of the plurality of search criteria following the dynamic displaying of the updated counts, the second set of user selections including movement of the sliding pointer; and dynamically display a second set of updated counts from an intermediate search performed with the movement of the sliding pointer, the second set of updated counts showing changes to the segment counts to provide what-if simulations to the user in real-time.

16. The machine-readable medium of claim 15, wherein the predefined scenario comprises Customer Relation Management applications including market segment specification; inventory management applications; or event management applications.

17. The machine-readable medium of claim 15, further comprising changing values for variable parameters in response to receiving at least one of a low value, a high value, or a range of values for the variable parameters from the user.

18. The machine-readable medium of claim 15, wherein dynamically displaying the updated count of the search results further comprises displaying the updated count of the search results or counts of intermediate search results associated with at least some combinations of the criteria combined by the Boolean operations.

19. The machine-readable medium of claim 15, further comprising saving one or more settings of the GUI in response to an action by the user.

20. The machine-readable medium of claim 19, further comprising displaying a saved setting of the GUI, in response to an action by the user, and receiving further modifications of the saved setting.

21. The machine-readable medium of claim 15, wherein dynamically displaying the updated count of the search results further comprises displaying the updated count of the search results after a change in a setting of the GUI, as triggered by detection of an event from an input device including a mouse and a keyboard.

* * * * *